Aug. 28, 1951     H. C. MONROE     2,565,776
FLEXIBLE COUPLING
Filed April 3, 1946
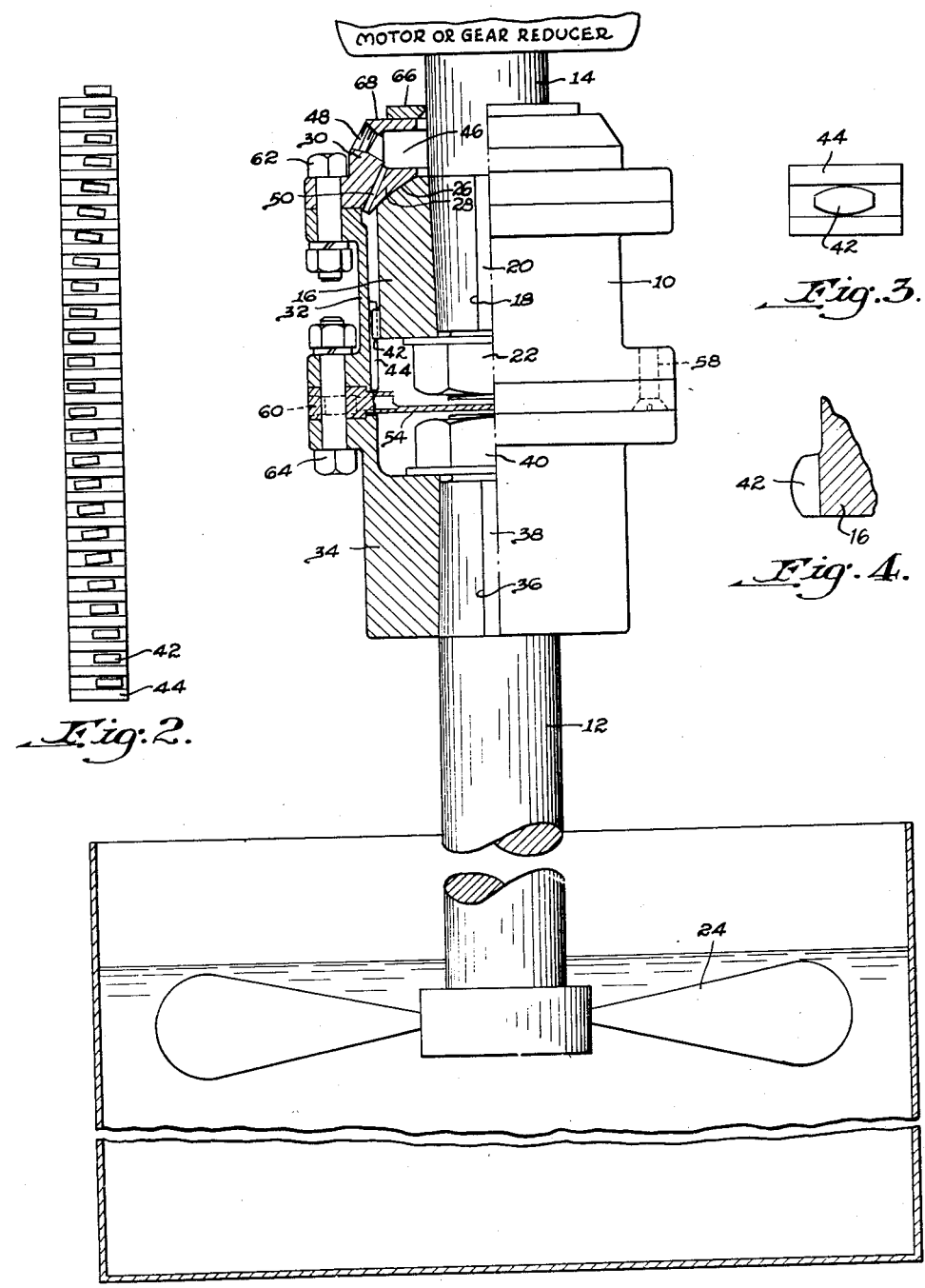
INVENTOR
HARRY C. MONROE
WITNESSES:
BY *his* ATTORNEY Patented Aug. 28, 1951

2,565,776

UNITED STATES PATENT OFFICE 2,565,776

FLEXIBLE COUPLING

Harry C. Monroe, Baltimore, Md., assignor to Koppers Company, Inc., Pittsburgh, Pa., a corporation of Delaware Application April 3, 1946, Serial No. 659,354

4 Claims. (Cl. 64—9)

This invention relates to couplers for connecting vertically arranged rotary members. More particularly the invention relates to a coupler for connecting a vertical high speed driven shaft with a non-aligning vertically suspended axis or shaft for an agitator, centrifugal separator or the like.

High speed stirrers, agitators, centrifugals and the like are often supported on the lower end of a vertically mounted shaft or axis. If the driven axis is not in good alignment with the vertical driving shaft, a very great strain is placed on the bearings of the driving shaft. Furthermore, this non-alignment sets up severe bending strains in the shafts. In case the agitator, centrifugal or other part is directly suspended from the lower end of a vertical driving shaft undesirable strains may be placed on the bearings of the driving shaft if the product being treated by the agitator or the load in a centrifugal causes the parts to become unbalanced, especially when rotating at high speeds. A self-aligning coupling between vertically arranged driving and driven shafts will remove the bending strain on the shafts and the bearing strain.

The primary object of the present invention is to provide a coupler for vertically arranged shafts which is simple and efficient in operation.

A further object of the invention is to provide a coupler for vertically arranged shafts with a thrust bearing which has a very long life in operation.

Another object of the invention is to provide a coupler for connecting the shaft of a driven member which is suspended from the lower end of a vertically aligned driving shaft.

With these and other objects in view the invention consists in the coupler for connecting vertically arranged shafts as hereinafter described, and particularly defined in the appended claims.

The various features of the invention are illustrated in the accompanying drawings in which:

Figure 1 is a view in vertical elevation with parts shown in section of a coupler embodying the preferred form of the invention for coupling a stirrer or agitator with a vertically arranged driving shaft;

Figure 2 is a diagrammatic view illustrating the position of the connecting splines of the coupler when the vertically arranged shafts are in angular misalignment;

Figure 3 is a detail end view of the spline on the coupler block illustrating the shape of the splines to permit a comparatively large angle of alignment of the coupling member; and Figure 4 is a detail sectional view of a spline on the coupler block showing the curved or arcuate form of the outer end of the splines.

Referring to Figure 1, a coupler 10 is utilized for connecting a propeller driven shaft 12 with a motor or gear driven shaft 14. The shaft 14 has a slight taper at its lower end which receives a bearing block 16. A keyway 18 is formed in the shaft 14 and block 16 to receive a key 20 by which the block 16 is fixed for rotation with the shaft 14. The block is normally held in fixed position on the tapered shaft by means of a nut 22 threaded on the lower end of the shaft 14.

As illustrated in Figure 1, a propeller or agitator 24 which is fixed on the lower end of the shaft 12 is suspended from the shaft 14 by the coupler 10. In most cases it is preferred to use a bottom bearing for the shaft 12 to hold it in fixed position, but the coupler 10 normally sustains the weight of the stirrer or member attached to the bottom of the shaft 14.

To provide for the thrust of the driven member upon the driving shaft the upper face of the block 16 has a spherical surface 26 which is arranged to cooperate with a similar spherical surface formed on the bottom of an inwardly projecting ledge 28 on the inner surface of a cap 30 which is attached to a cylinder 32 forming the outer portion of the coupler 10. The weight of the shaft 12 with the stirrer 24 is supported by the spherical bearing surface 26.

The upper end of the shaft 12 has a slightly tapered surface which is fitted into a block or sleeve 34 forming the lower end of the coupler 10. A keyway 36 is formed in the sleeve 34 and shaft 12 which is arranged to receive a key 38 by which the shaft 12 and coupler 10 will be fixed for rotation with one another. The shaft is firmly held in position in the sleeve 34 by means of a nut 40, which is threaded upon the upper end of the shaft 12. On the inner surface of substantially the bottom half of the cylinder 32 are formed a series of long splines 42 which are arranged to receive splines 44 formed on the bottom circumferential surface of the block 16. With this arrangement, the rotation of the shaft 14 to turn the block 16 will simultaneously rotate the cylinder 32 and sleeve 34 to rotate the shaft 12.

An oil cavity 46 is formed in the top of the cap into which oil may be inserted through an opening 48. A series of oil holes 50 are formed around the base of the cavity 46 by which oil may flow from the cavity into the space between block 16 and the cylinder 30 to lubricate the splines 42 and 44. The oil may pass around the inner edge of the cap 30 at the base of the cavity into the spherical bearing 26 through oil grooves between the block 16 and a supporting ring 30. An oil plate 54 is attached to the bottom of the cylinder 32 by means of a series of screws 58 which are threaded through the plate and into a flange formed at the bottom of the cylinder 30. A drain opening 60 is formed at the edge of the oil plate by which oil from the inside of the coupler 10 may be removed. The oil plate prevents the escape of oil into the bottom of the coupler by which it might work out of the coupling along the keyway 36. The cap 30 and the upper end of the cylinder 32 are fastened together by bolts 62, such bolts being uniformly distributed around the periphery of the cap. The flange at the lower end of the cylinder 32, the oil plate and a flange at the top of the sleeve 34 of the coupling are held together by means of bolts 64, the bolts being distributed uniformly around the periphery of the cylinder.

In ordinary operation of the coupler, the oil cavity 46 and the space between the block 16 and cylinder 32 and the cavity between the oil plate and the bottom of the block 16 are filled with a lubricant which preferably is a liquid. It is desirable to prevent dirt from getting into the lubricant. Therefore a cover plate 66 having an inner bore which snugly fits the shaft is arranged to have a sliding mounting on a flat surface 68 at the top of the coupling cap 30. If the two shafts assume a slightly angular position in making adjustment for non-alignment, the cap and cylinder of the coupler may move toward and from the shaft 14, but the plate 66 will close the space between the inner edge of the flat surface 68 and the shaft.

In Figure 2 is shown in a flat layout position a diagram of the splines 44 of the cylinder 32 and the splines 42 on the block 16. The different positions of the short splines with reference to the long splines is the position which the short splines take in the coupler due to an angular misalignment of the shafts. This diagram shows that at one side of a central position two of the edges or corners of the short splines tend to closely approach the faces of the long splines, while on the opposite side of the central position the other two edges of the short splines closely approach the faces of the long splines. In the central position the short splines are centrally located between the long splines. With this construction it will be seen that the limit of the amount of angular adjustment which will be permitted by the coupler 10 is limited to the amount of angular adjustment that is permitted when the edges of the short splines strike the faces of the long splines.

For most vertical shaft alignments the rectangular splines will provide a sufficient angular adjustment of the shafts to take care of non-alignment and avoid strain on the shaft bearings. With some types of machinery, such as stirrers, centrifugals and the like, which are inclined to get out of balance due to the loading of the members or the type of product being worked, a greater angular adjustment of the shafts through the coupler is desired. To provide for this, the short splines on the block 16 are shaped as shown in Figures 3 and 4. It will be noted that the side faces of the shorter splines have an arcuate curvature which will permit a greater angular relationship between the shafts than the rectangular type of splines illustrated in Figure 2. It will be noted, furthermore, that the top edges or crowns of the short splines tend to strike the base of the long splines as the angular adjustment of the shafts increases and, therefore, the tops or crowns of the short splines may have an arcuate curvature as illustrated in Figure 4. In most cases, it is desirable to give an arcuate curvature to the ends of the splines, as well as to the faces of the short splines. Viewing Figure 3, it will be seen that only a small clearance must be provided between the side faces of the short splines and the side faces of the long splines so that this type of connection between the coupler members will have a small amount of back lash. The radial curvature of the side faces and ends or crowns of the splines may be changed to permit different angular adjustments of the driving shafts. The curved faces on the short splines are very desirable but it is understood that the formation of such splines increases the cost of the coupling.

The preferred form of the invention having been thus described, what is claimed as new is:

1. A coupling for vertically arranged shafts comprising: a supporting block to be fixed on the lower end of a vertically arranged shaft, a hollow coupler arranged to enclose and surround the block, a spherical bearing surface on the upper end of the block, a spherical thrust bearing surface formed within the coupler and contacting the spherical bearing surface on the block, means to hold the coupler in fixed position on another vertically aligned shaft, splines surrounding the lower peripheral face of the block and longer splines formed within the coupler arranged to mesh with the splines on the block, an oil chamber at the top of the coupler, and lubricant ducts leading from the chamber to the spherical bearing and the splines.

2. A coupling for vertically arranged shafts comprising: a supporting block to be fixed on the lower end of a vertically arranged shaft, a hollow coupler arranged to enclose and surround the block, a spherical bearing surface on the upper end of the block, a spherical thrust bearing surface formed within the coupler and contacting the spherical bearing surface on the block, means to hold the coupler in fixed position on another vertically aligned shaft, splines surrounding the lower peripheral face of the block and longer splines formed within the coupler arranged to mesh with the splines on the block, an oil chamber formed in the top of the coupler, lubricant ducts leading from the chamber to the spherical bearing and the splines, and an oil plate below the splines to close the coupler below the block to hold oil in the coupling.

3. The coupling defined in claim 1 in which a dust ring having a bore to snugly fit the upper vertical shaft is slidably mounted on a flat top surface of the coupling.

4. The coupling defined in claim 1 in which the hollow coupler is formed in two parts with an oil plate between the parts in the lower interior portion of the coupler to form an oil chamber for submerging said splines in lubricant.

HARRY C. MONROE.

REFERENCES CITED

The following references are of record in the file of this patent:

UNITED STATES PATENTS

| Number | Name | Date |
|---|---|---|
| 477,625 | Detrick | June 21, 1892 |
| 1,094,603 | Scott | Apr. 28, 1914 |
| 1,770,744 | Morgan | July 15, 1930 |
| 1,835,506 | Linn | Dec. 8, 1931 |
| 1,962,229 | Adams | June 12, 1934 |
| 2,035,171 | Loewus | Mar. 24, 1936 |